United States Patent [19]

Tinarelli

[11] Patent Number: 5,784,795
[45] Date of Patent: Jul. 28, 1998

[54] TOUCH PROBE

[75] Inventor: Leonida Tinarelli, Bologna, Italy

[73] Assignee: Marposs, S.p.A., Bentivoglio, Italy

[21] Appl. No.: 649,674

[22] PCT Filed: Nov. 24, 1994

[86] PCT No.: PCT/EP94/03894

§ 371 Date: May 23, 1996

§ 102(e) Date: May 23, 1996

[87] PCT Pub. No.: WO95/15477

PCT Pub. Date: Jun. 8, 1995

[30] Foreign Application Priority Data

Dec. 1, 1993 [IT] Italy .............. BO93 A 000481

[51] Int. Cl.⁶ .................................................. G01B 5/03
[52] U.S. Cl. ................................................... 33/559
[58] Field of Search ........................ 33/503, 556, 557, 33/558, 559, 560, 561

[56] References Cited

U.S. PATENT DOCUMENTS

| | | | |
|---|---|---|---|
| 4,510,693 | 4/1985 | Cusack | 33/561 |
| 4,547,971 | 10/1985 | Imazeki | |
| 4,763,421 | 8/1988 | Feichtinger | 33/561 |
| 4,859,817 | 8/1989 | Cassani | 33/561 |
| 5,024,003 | 6/1991 | Breyer | 33/561 |
| 5,299,361 | 4/1994 | Fiedler | 33/559 |
| 5,323,540 | 6/1994 | McMurtry et al. | 33/556 |
| 5,435,072 | 7/1995 | Lloyd et al. | 33/559 |

FOREIGN PATENT DOCUMENTS

| | | | |
|---|---|---|---|
| 0 204 926 | 12/1986 | European Pat. Off. | |
| 1341492 | 9/1987 | U.S.S.R. | 33/503 |
| WO 93/10943 | 6/1993 | WIPO | |

*Primary Examiner*—G. Bradley Bennett
*Attorney, Agent, or Firm*—Dickstein Shapiro Morin & Oshinsky, LLP

[57] ABSTRACT

A touch probe with a base unit comprising a casing, a movable arm-set assembly housed in the casing and provided with an arm protruding from the casing and a feeler fixed to the arm end external to the casing, and an adjustment and locking device for locking the base unit to a support. In order to adjust the position of the feeler, the adjustment and locking device comprises a first and a second reference element with substantially spherical couplings between the base unit and the support and two locking elements, coupled to the base unit and to the support, and adjustable along a longitudinal direction. At least the first of the reference elements is adjustable along the longitudinal direction.

13 Claims, 1 Drawing Sheet

TOUCH PROBE

TECHNICAL FIELD

The present invention relates to a touch probe, with a base unit comprising a casing, a movable arm-set assembly housed in the casing and provided with an arm protruding from the casing and a feeler fixed to the arm end external to the casing, and an adjustment and locking device for locking the base unit to a support and adjusting the position of the feeler by means of rotational displacements about a first geometrical axis, wherein the adjustment and locking device comprises a first and a second reference element with substantially spherical couplings between the base unit and the support for enabling rotational adjustment displacements of the base unit about the first geometrical axis, and two locking elements, coupled to the base unit and to the support, and adjustable along a longitudinal direction, perpendicular to the first geometrical axis.

BACKGROUND ART

Touch probes for checking dimensions of mechanical pieces, or tools, and for performing other similar checkings, comprise adjustment devices for adjusting the position of the probe feeler with respect to pre-set references. For example, in the case of applications on lathes, for checking tools, the references could consist in the longitudinal and transversal axes of the lathe and in the case of applications on machining centres, for checking machined, or to be machined, workpieces, the reference could be the axis of the spindle.

U.S. Pat. No. 4,510,693 discloses a probe, for use in machining centres, comprising an adjustment device with two annular washers having non-parallel surfaces, i.e. beveled shaped, that are mounted between the base unit of the probe and a mechanical adapter with a tapered shank that is clamped in the machine spindle. In order to bring the geometrical axis of the movable arm of the probe in alignment with the axis of the spindle, the two washers can simultaneously rotate with respect to the base unit of the probe and the mechanical adapter and, therefore, reciprocally rotate. Once the required alignment has been reached, the washers are clamped.

Another known adjustment and locking device comprises a central tapered seat formed in an adapter and a ball that is housed in the seat and enables the rotation of the base unit of the probe about the centre of the ball. In this way it is possible to obtain the desired location, and, hence, the base unit of the probe is clamped to the adapter by means of three or four screws.

A further known adjustment and locking device, enables rotational adjustment displacements of the base unit of the probe about a single geometrical axis passing through the centres of two balls placed between an adapter and the base unit. The base unit is locked in the desired location by means of two locking screws.

It is also known to provide a movable arm of a probe made of two portions, and to insert and clamp between the two portions a replaceable pin, with a preferential breakage section, that has the purpose of preventing any serious damage from occurring to the probe in the event of accidental impacts of the feeler. In the case of probes with a substantially cubic shaped feeler, intended for checking tools, it is possible, by unlocking an end of the pin, to perform a rotational adjustment displacement of the portion of the arm carrying the feeler about the geometrical axis of the arm.

The known adjustment devices are subject to some drawbacks, more specifically regarding their considerable layout dimensions, problems that may arise when performing the adjustment and locking operations, the presence of elements of the device in critical areas of the probe and, in the case of the lastly mentioned known adjustment device of the base unit, the possibility of adjusting the base unit about a single geometrical axis.

DISCLOSURE OF INVENTION

Object of the invention is to provide a probe with an adjustment device of the base unit that, in addition to enabling adjustment displacements about at least two perpendicular geometrical axes, has a structure that is favourably compatible with the other elements and devices of the probe, is particularly inexpensive and considerably simple to adjust and lock.

This and other objects are achieved by a probe wherein at least the first of the reference elements is adjustable along the longitudinal direction, to enable rotational displacements, for the adjustment of the base unit, about a second geometrical axis, perpendicular to the first geometrical axis and to said longitudinal direction, by means of the spherical coupling defined by the second reference element.

The structure of the probe according to the invention enables the arranging of all the elements of the adjustment device, basically the two reference elements and the two locking elements, away from the longitudinal geometrical axis of the probe, in particular near the rim of a flange connected to both the casing and the probe support. In this way, the central part of the probe is free, mainly for the passage of the electric cable of the probe.

The structure of the adjustment and locking device is particularly suitable in the case of probes with feelers having a substantially cubic, or rectangular parallelepipedon shape, for checking tools in chip removing machines, like lathes and machining centres. In these probes, the purpose of the adjustment is, fundamentally, to align the lying position of the faces of the feeler with the machine axes. The adjustment is particularly simple thanks to the possibility of rotating the base unit of the probe about two pre-fixed geometrical axes that are perpendicular between each other.

Furthermore, in these probes it is possible to apply, according to a known method, a safety pin with a preferential breakage section, for adjusting the feeler by causing it to rotate about the geometrical axis of the arm and of the pin.

BRIEF DESCRIPTION OF THE DRAWINGS

The invention is now described in more detail with reference to a preferred embodiment, shown in the enclosed drawings, given by way of non limiting example, in which.

BEST MODE FOR CARRYING OUT THE INVENTION

Figure 1:
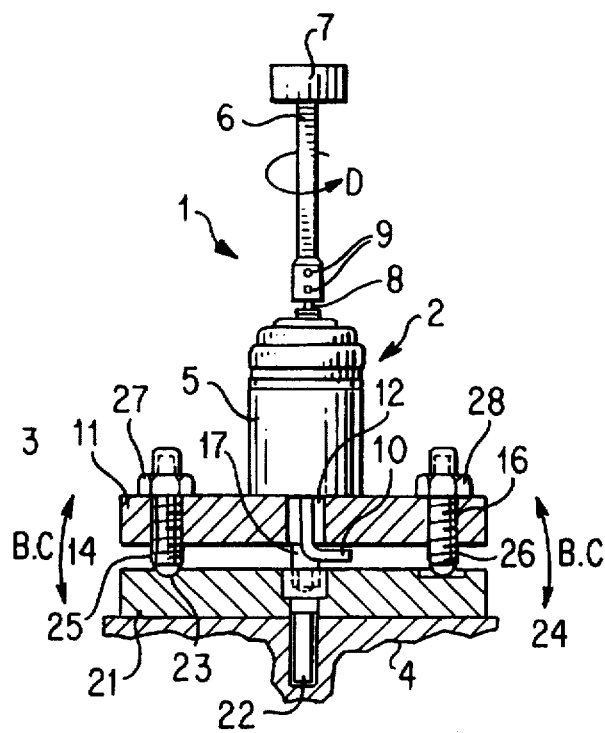
FIG. 1 is a front view of a base unit of a touch probe and a cross-sectional view, along lines I—I in FIG. 3, of an adjustment device and a support.
Figure 2:
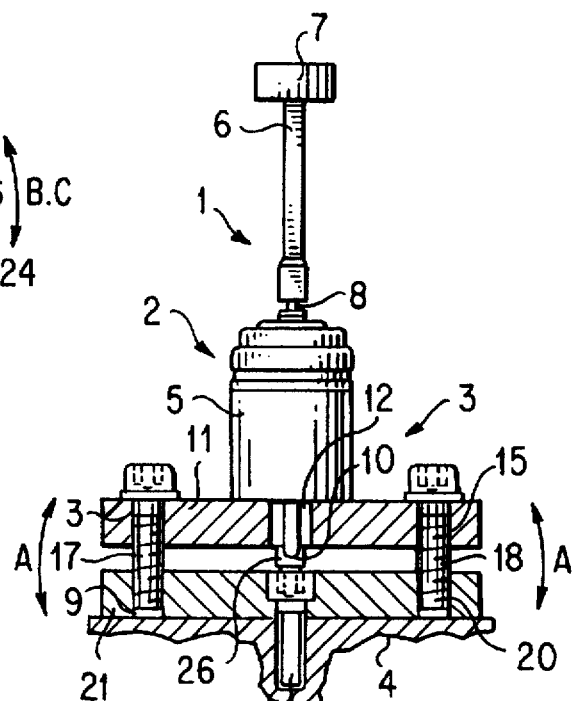
FIG. 2 is a side view of the base unit illustrated in FIG. 1 and a cross-sectional view, taken along lines II—II of FIG. 3, of the adjustment device and the support.
Figure 3:
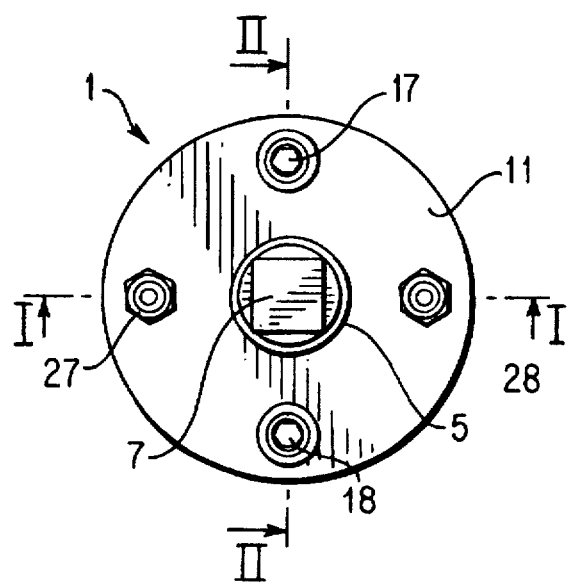
FIG. 3 is a top view of the base unit and the adjustment device shown in FIGS. 1 and 2.

The probe 1, illustrated in FIGS. 1-3, comprises a base unit 2, that forms the actual probe, and an adjustment and locking device 3 for clamping base unit 2 to a support 4. Support 4 can, for example, be fixed directly, or by means of a precision retraction device, to the bed of a numerical control lathe, or to the worktable of a machining centre. Base unit 2 comprises a casing 5, a movable arm-set assembly partly housed in the casing 5 and bearing an arm 6 protruding from the casing and a device, housed within the casing 5, for detecting the displacement of the movable arm-set assembly.

The movable arm 6 carries a feeler 7 at its end outside the casing 5. According to the illustrated example, that refers to a probe 1 for checking tools, feeler 7 has a substantially rectangular parallelepipedon shape. The movable arm 6 includes two portions, connected by a replaceable pin 8, providing a preferential breakage section, whose two ends are secured to the two portions of the arm 6 by means of a threaded coupling, not shown in the drawings, and two locking screws 9, shown in FIG. 1. According to the application, the movable arm-set assembly can have a different amount of degrees of freedom. For example, the displacements of the movable arm-set assembly from the rest position shown in the figures can comprise rotational displacements about a point lying in a longitudinal axis of symmetry and translation displacements along the aforementioned axis of symmetry (downwards starting from the condition shown in FIGS. 1 and 2). A probe of this type is disclosed in the international patent application published under No. WO-A-9114149.

Depending on the type of use of probe 1, even the detecting device can differ, not only in respect of the directions, but also for the type of detecting operation it performs: contact detecting (in particular, by means of microswitch/es), or actual measurement.

Furthermore, probe 1 comprises connection and transmission devices for transmitting the signal provided by the detecting device to an external detecting or interfacing electric unit. Among other things, these connection and transmission means comprise a cable 10, connected to the detecting device, axially coming out through a hole in a base of casing 5.

The adjustment and locking device 3 comprises a plate 11 fixed, in a way not shown in the drawings, to a lower base of casing 5. In the illustrated example plate 11 has a circular shape, with a central hole 12 for the passage of cable 10 and four peripheral holes 13,14,15 and 16, arranged at equal radial distances from the formerly mentioned axis of longitudinal symmetry and at an angular distance of 90 degrees from one another.

Two locking elements, or screws 17, 18 have heads adapted to cooperate with the upper face of plate 11 and stems that, by passing through opposite holes 13, 15, engage in threaded holes 19, 20, formed in a second plate 21, facing the first plate 11. The second plate 21 is firmly fixed to support 4 by means of screws 22, only one of which is shown in the drawings. Plate 21 has, in correspondence with its upper face facing the lower face of plate 11, two resting and reference seats 23, 24, the first of which is cone-shaped and the second is Vee-shaped. The Vee-shaped seat 24 has its longitudinal axis of symmetry arranged towards the cone-shaped seat 23 (i.e. the aforementioned axis of symmetry lies in the cross-sectional plane indicated by line I—I). The seats 23, 24 house small balls, secured to the lower ends of the stems of two reference elements, or threaded dowels 25, 26, respectively, that engage in threaded holes 14, 16. The cooperation between the reference seats 23, 24 and the small balls defines two spherical couplings between the first plate 11 and the second plate 21. Dowels 25, 26 are axially adjustable with respect to plate 11, by means of a key that engages in hexagonal sockets at the upper ends of the dowels, and can be locked by means of nuts 27, 28 abutting against the upper surface of plate 11.

The previously described probe enables to perform, in a simple and rapid way, the adjustment operations required for aligning the geometrical axis of arm 6 along a reference direction defined by the machine, whereto there is fixed support 4, and for arranging the faces of the feeler 7 parallel to reference planes defined by the machine itself.

To bring into alignment the geometrical axis of arm 6, it is necessary to operate on screws 17, 18 and dowels 25, 26 by accomplishing rotational displacements of plate 11 and base unit 2 about three geometrical axes. The first of the three geometrical axes passes through the centres of the two small balls arranged at the lower ends of the threaded dowels 25, 26 and into contact with the associated seats 23, 24. The second geometrical axis passes through the centre of the small ball associated with the threaded dowel 25 and is perpendicular to the first geometrical axis. The third geometrical axis passes through the centre of the small ball associated with the threaded dowel 26 and is perpendicular to the first geometrical axis and parallel to the second geometrical axis. The directions of these displacements are indicated by arrows A, B and C in FIGS. 1 and 2. Once the geometrical axis of the arm has been brought into alignment, screws 17, 18 and dowels 25, 26 are locked.

To bring into alignment the faces of the feeler, it is necessary to unlock the two screws 9, more specifically, to rotate, as indicated by arrow D in FIG. 1, arm 6 about its axis and lock screws 9 again.

In many applications it is necessary to have available touch probes with very small layout dimensions. In these cases the features of the adjustment and locking device 3 are particularly advantageous, among other things because this device enables the passage of cable 10, through hole 12, along the longitudinal axis of symmetry of base unit 2. It is possible to replace one of the two dowels 25, 26 with a small ball placed between one of the seats 23, 24 and corresponding seats formed in plate 11. In this case, plate 11 can rotate about two geometrical axes only without diminishing the adjustment capability.

Other possible modifications regard the application of the invention to probes without an external connecting cable, for example, battery powered probes with transmission system of optoelectronic, radio waves, or similar type, the possibility of eliminating plate 21, and forming seats 23, 24 directly on support 4, thus obtaining plate 11 as a single body with casing 5.

I claim:

1. A touch probe, with a base unit comprising a casing, a movable arm-set assembly housed in the casing and provided with an arm protruding from the casing and a feeler fixed to the arm end external to the casing, and an adjustment and locking device for locking the base unit to a support and adjusting the position of the feeler by means of rotational displacements about a first geometrical axis, wherein the adjustment and locking device comprises a first and a second reference element with substantially spherical couplings between the base unit and the support for enabling rotational adjustment displacements of the base unit about the first geometrical axis, and two locking elements, coupled to the base unit and to the support, and adjustable along a longitudinal direction, perpendicular to said first geometrical axis, characterized in that at least one of the reference elements is adjustable along the longitudinal direction, to enable rotational displacements, for the adjustment of the base unit, about a second geometrical axis, perpendicular to the first geometrical axis and to said longitudinal direction, by means of the spherical coupling defined by a second reference element.

2. A probe according to claim 1, wherein said first reference element includes a first threaded dowel having a free end adapted to define one of said spherical couplings.

3. A probe according to claim 2, wherein the second reference element includes a second threaded dowel having a free end adapted to define another of said spherical couplings.

4. A probe according to one of claims 1 to 3, wherein the adjustment and locking device comprises two members fixed to the base unit and to the support respectively, the two members being reciprocally adjustable by means of said two locking elements and reference elements.

5. A probe according to claim 4, wherein one of said members is threadedly coupled to at least one of the reference elements and the other member defines two seats for the free ends of said reference elements.

6. A probe according to claim 5, wherein one of said two seats has a substantially cone-shape and the other a Vee-shape, the longitudinal axis of the Vee-shaped seat being aligned with the cone-shaped seat.

7. A probe according to claim 4, wherein one of said members comprises a plate, with a central hole, the plate being fixed to said casing, said first and second reference elements and said two locking elements being arranged in correspondence with the rim of the plate.

8. A probe according to claim 7, wherein the base unit comprises an electric cable coming out of the casing and passing through said central hole.

9. A probe according to one of claims 1 to 3, wherein said arm comprises two portions connected by an intermediate element by means of a detachable connection for allowing reciprocal rotations of said two portions.

10. A probe according to one of claims 1 to 3, for checking tools, wherein said feeler has a substantially rectangular parallelepiped shape.

11. A device for locking and adjusting the position of a touch probe to a support, including:

two members fixed to the touch probe and to the support, respectively, two reference elements coupled to one of said two members, at least one of said reference elements being adjustable along a longitudinal direction, two seats defined in the other one of said two members, each of said reference elements having a free end at least partially housed in one of the seats to define a substantially spherical coupling, and two locking elements, coupled to both the two members and adjustable along said longitudinal direction.

12. A device according to claim 11, wherein said at least one reference element includes a threaded dowel coupled in a threaded relationship to said member.

13. A device according to claim 11 or claim 12, wherein said free ends of the reference elements have a substantially hemispherical shape.

* * * * *